US011404066B2

(12) United States Patent
 Chae (10) Patent No.: US 11,404,066 B2
(45) Date of Patent: Aug. 2, 2022

(54) DEVICE AND METHOD FOR PROVIDING VOICE RECOGNITION SERVICE BASED ON ARTIFICIAL INTELLIGENCE

(71) Applicant: LG ELECTRONICS INC., Seoul (KR)

(72) Inventor: Jonghoon Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 394 days.

(21) Appl. No.: 16/566,587

(22) Filed: Sep. 10, 2019

(65) Prior Publication Data
 US 2020/0005795 A1 Jan. 2, 2020

(30) Foreign Application Priority Data
 Jul. 11, 2019 (KR) .......................... 10-2019-0084059

(51) Int. Cl.
 *G06N 20/00* (2019.01)
 *G10L 17/00* (2013.01)
 *H04W 52/02* (2009.01)
 *G06F 3/16* (2006.01)

(52) U.S. Cl.
 CPC .............. *G10L 17/00* (2013.01); *G06F 3/167* (2013.01); *G06N 20/00* (2019.01); *H04W 52/0229* (2013.01)

(58) Field of Classification Search
 None
 See application file for complete search history.

(56) References Cited

U.S. PATENT DOCUMENTS

| 2016/0148615 | A1  | 5/2016  | Lee et al. |
| 2018/0342237 | A1* | 11/2018 | Lee .......................... G10L 15/08 |
| 2019/0180758 | A1* | 6/2019  | Washio .................... G10L 25/87 |

FOREIGN PATENT DOCUMENTS

| KR | 10-2016-0064258 A | 6/2016  |
| KR | 10-2018-0130648 A | 12/2018 |

\* cited by examiner

*Primary Examiner* — Nafiz E Hoque
(74) *Attorney, Agent, or Firm* — Birch, Stewart, Kolasch & Birch, LLP

(57) ABSTRACT

Provided are a device and a method for providing a voice recognition service based on artificial intelligence. Provided is a device for recognizing a voice based on artificial intelligence for waking up an electronic device in a user specific manner including: an input unit configured to receive voice signals having different frames specific to different users; and a processor configured to: convert the voice signal into a frequency domain signal having a plurality of voice frames in a time domain to extract at least one spectrum associated with each voice frame of the frequency domain signal; configure a template associated with a wake-up voice specific to a first user; and receive a first voice signal and compare the first voice signal with the template to determine whether the first voice signal matches the first user, and to determine whether to wake-up the electronic device based on the determination result.

4 Claims, 6 Drawing Sheets

DEVICE AND METHOD FOR PROVIDING VOICE RECOGNITION SERVICE BASED ON ARTIFICIAL INTELLIGENCE

CROSS-REFERENCE TO RELATED APPLICATIONS

This application claims priority to Korean Patent Application No. 10-2019-0084059 filed on Jul, 11, 2019 in Korea, the entire contents of which is hereby incorporated by reference in its entirety.

BACKGROUND

The present invention relates to a device and a method for providing a voice recognition service based on artificial intelligence.

Artificial intelligence is a field of computer engineering and information technology that studies a method for allowing computers to think, learn, self-develop, and the like that may be performed by human intelligence. The artificial intelligence means that the computers may imitate the human intelligence.

Further, the artificial intelligence does not exist by itself, but directly or indirectly related to other fields of the computer science. Particularly in the modern age, attempts to introduce artificial intelligence elements in various fields of the information technology and to utilize the artificial intelligence elements in solving problems in the field are being actively carried out.

In one example, in recent years, techniques for applying the artificial intelligence to home appliances and operating the artificial intelligence for various purposes have been attempted. The home appliance is automatically programmed adapted to a purpose and controlled without human intervention. In one example, a voice recognition technology using the artificial intelligence has been developed.

In this regard, Korean Patent Application Publication No. 2016-0064258 (voice recognition method and electronic device) discloses a voice recognition method and an electronic device including: recognizing, in a first processor using a clock in a low power mode of the electronic device, a voice signal inputted through a microphone; entering, if the recognized voice signal is a previously set keyword, an active state and performing voice recording of the voice signal in a second processor; and performing voice recognition in the second processor if it is determined that an end of a voice input is reached during the voice recording.

However, according to related art, when an interval in which utterance is stopped between a wake-up voice and a command voice is below a preset time period, that is, when the wake-up voice and the command voice are continuous, a boundary between the wake-up voice and the command voice is unclear, so that wake-up voice recognition or utterance analysis is not performed correctly.

SUMMARY

A purpose of the present invention is to provide a device and a method for recognizing a voice based on artificial intelligence that extract a template from a voice of a user to recognize the user even when a boundary between a wake-up voice and a command voice is unclear.

Another purpose of the present invention is to provide a device and a method for recognizing a voice based on artificial intelligence that determine, when an input voice is an external voice other than a voice of a user, the input voice as a non-wake-up voice to prevent a malfunction.

In a first aspect of the present invention, there is provided a method for recognizing a voice based on artificial intelligence for waking up an electronic device in a user specific manner including: a first step of receiving voice signals having different frames specific to different users; a second step of configuring a template associated with a wake-up voice specific to a first user; and a third step of receiving a first voice signal and comparing the first voice signal with the template to determine whether the first voice signal matches the first user, and determining whether to wake-up the electronic device based on the determination result.

In one implementation of the first aspect, the first step may further include: converting the voice signal into a frequency domain signal having a plurality of voice frames in a time domain; and extracting at least one spectrum associated with each voice frame of the frequency domain signal.

In one implementation of the first aspect, the second step may include: distinguishing the first user from the voice signals; collecting the wake-up voice specific to the first user; and matching the first user with the wake-up voice specific to the first user.

In one implementation of the first aspect, the matching of the wake-up voice may further include: extracting a representative value or an average value from the spectrum; and classifying the representative value or the average value by clustering.

In one implementation of the first aspect, the third step may further include: extracting a spectrum for the first voice signal; and comparing the spectrum with the template specific to the first user to calculate a distance.

In one implementation of the first aspect, the calculating of the distance may further include: comparing a length of the distance with a predetermined error range; and outputting a wake-up signal or a non-wake-up signal to control the electronic device when the length of the distance is greater than the predetermined error range.

In a second aspect of the present invention, there is provided a device for recognizing a voice based on artificial intelligence for waking up an electronic device in a user specific manner including: an input unit configured to receive voice signals having different frames specific to different users; and a processor configured to: convert the voice signal into a frequency domain signal having a plurality of voice frames in a time domain to extract at least one spectrum associated with each voice frame of the frequency domain signal; configure a template associated with a wake-up voice specific to a first user; and receive a first voice signal and compare the first voice signal with the template to determine whether the first voice signal matches the first user, and to determine whether to wake-up the electronic device based on the determination result.

In one implementation of the second aspect, the processor may be configured to convert the voice signal into the frequency domain signal having the plurality of voice frames in the time domain to extract the at least one spectrum associated with each voice frame of the frequency domain signal.

In one implementation of the second aspect, the processor may be configured to: distinguish the first user from the voice signals; collect the wake-up voice specific to the first user; and match the first user with the wake-up voice specific to the first user.

In one implementation of the second aspect, the processor may be configured to: extract a representative value or an average value from the spectrum; and classify the representative value or the average value by clustering to match the first user with the wake-up voice specific to the first user.

In one implementation of the second aspect, the processor may be configured to: extract a spectrum for the first voice signal; and compare the spectrum with the template specific to the first user to calculate a distance.

In one implementation of the second aspect, the device may further include: an output unit configured to: compare the spectrum with the template specific to the first user to calculate a distance; and output a wake-up signal or a non-wake-up signal based on a difference between a length of the distance.

According, to the embodiment of the present invention, request voices are cumulatively input from users who are authorized to operate the electronic device to build a database to automatically distinguish a user.

Further, according to the embodiment of the present invention, the electronic device is automatically controlled in response to a voice signal associated to operation of the electronic device, thereby decreasing a risk of malfunction.

DETAILED DESCRIPTIONS

Hereinafter, embodiments of the present invention are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present invention is not limited thereto. It should be understood that all of variations, equivalents or substitutes contained in the concept and technical scope of the present invention are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening, component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
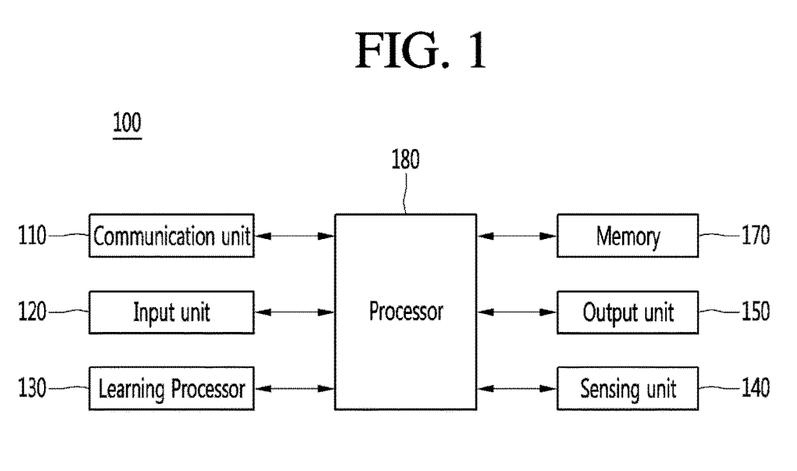
FIG. 1 illustrates an AI device according to an embodiment of the present invention.

FIG. 1 illustrates an AI device 100 according to an embodiment of the present invention.

The AI device 100 may be implemented by a stationary device or a mobile device, such as a TV, a projector a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™. RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
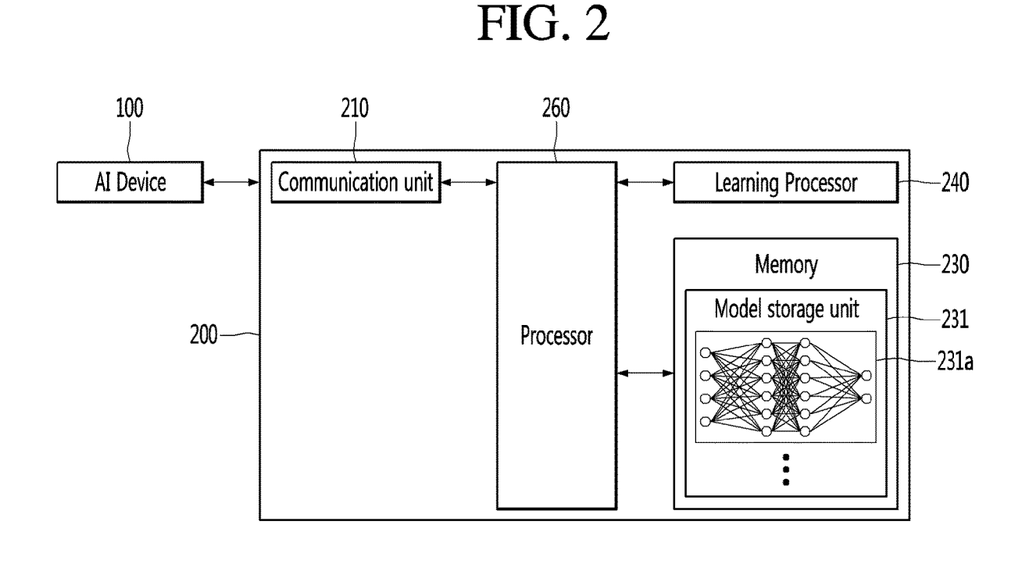
FIG. 2 illustrates an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
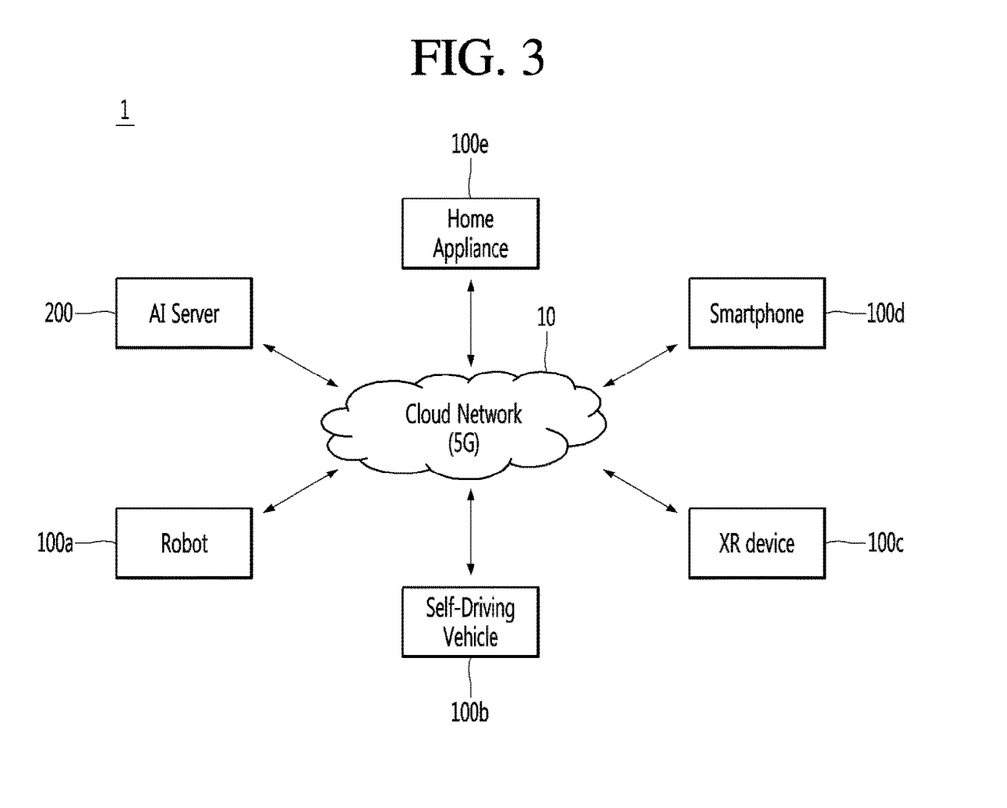
FIG. 3 illustrates an AI system 1 according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+ Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

<AI+ Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+ XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+ Robot+ Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+ Robot+ XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+ Self-Driving+ XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
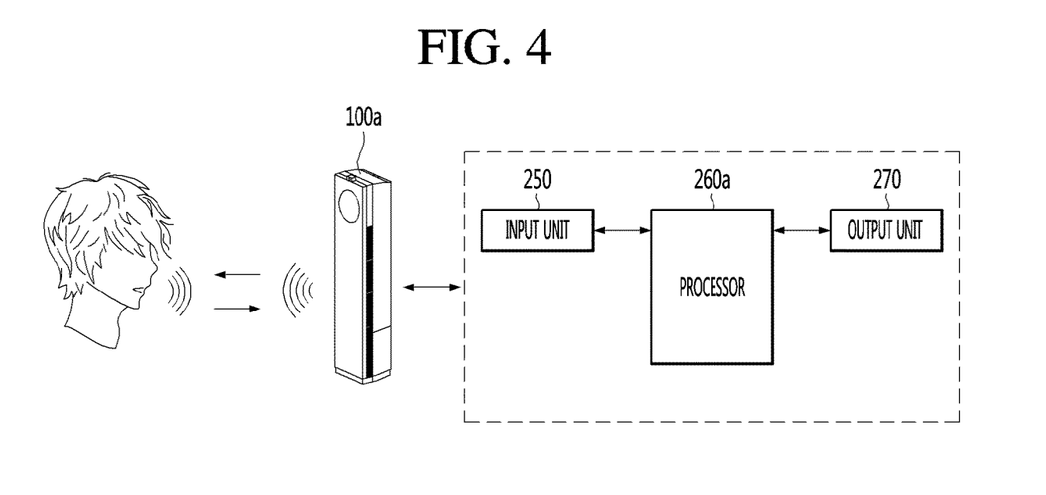
FIG. 4 illustrates a block diagram of a device for providing a voice recognition service based on artificial intelligence according to an embodiment of the present invention.

FIG. 4 illustrates a block diagram of a device for providing a voice recognition service based on artificial intelligence according to an embodiment of the present invention.

Referring to FIG. 4, a view of a device for providing a voice recognition service for an electronic device 100a that recognizes user's utterance is illustrated. The device for providing the voice recognition service may include an input unit 250, a processor 260a, and an output unit 270.

The device for providing the voice recognition service based on the artificial intelligence may be an example of the AI server 200 described in FIG. 2. That is, the components 210, 230, 240, and 260 included in the AI server 200 in FIG. 2 may be included in a device 200a for providing a voice recognition service based on artificial intelligence as well.

The electronic device 100a may correspond to an example of the AI device 100 in FIG. 2. That is, the components 110, 120, 130, 140, 150, 170, and 180 included in the AI device 100 in FIG. 1 may be included in a washing machine 100a as well.

In the voice recognition device based on artificial intelligence for waking up the electronic device 100a in a user specific manner, the input unit 250 may receive voice signals having different frames specific to different users.

The input unit 250 according to one embodiment of the present invention may include a microphone as a module for receiving a user's voice as an example. In particular, the input unit 250 may be integrated into the device or disposed outside the device to convert the input voice into a file and provide the file to the electronic device 100a. The input unit 250 receives voice data from the microphone and transmits the received voice data to the processor 260a such that the processor 260a may recognize the voice.

Further, the input unit 250 according to another embodiment of the present invention may include an artificial intelligence speaker having a voice recognition function. The artificial intelligence speaker may be installed in a space such as a living room or the like, where a user resides. In order to implement the present invention, the input unit 250 may include a smartphone owned by the user.

The input unit 250 may guide the user to utter a predetermined wake-up voice for a user registration procedure in an artificial intelligence secretary service, and then execute a voice registration for each user based on the user's utterance. When the user utters the wake-up voice after the voice registration for each user is completed, the input unit 250 may authenticate the user based on voice information of the corresponding wake-up voice via a user distinguishing function of the processor 260a.

The processor 260a may convert the voice signal into a frequency domain signal having a plurality of voice frames in a time domain to extract at least one spectrum associated with each voice frame of the frequency domain signal. Further, the processor 260a may configure a template associated with a wake-up voice specific to the user, receive an arbitrary voice signal and compare the arbitrary voice signal with the template to determine whether the arbitrary voice signal matches with the user, thereby determining whether to wake-up the electronic device 100a.

The processor 260a may convert the voice signal into the frequency domain signal having the plurality of voice frames in the time domain to extract the at least one spectrum associated with each voice frame of the frequency domain signal.

The processor 260a may sample the voice signal input through the input unit 250 on a frame unit basis to process the sampled voice signal by a combination of a method for estimating a frequency domain pitch and a method for estimating a time domain pitch. Further, the processor 260a may determine a pitch estimate for each voice signal sample and extract pitch information for each voice signal sample as a result.

According to an embodiment, the processor 260a may extract pitch information for the input voice signal to utilize available spectrum information. According to an embodiment, a spectrum of the voice signal may be extracted using a peak extraction method for extracting information of remaining signal feature point values, a method for selecting an order of a high order peak, and the pitch information.

The input unit 250 receives the voice signal using the microphone according to an embodiment. Further, the processor 260a converts the input voice signal from the time domain voice signal to the frequency domain voice signal according to an embodiment of the present invention. In this conversion process, a device for estimating spectrum information of a voice signal may be used.

The processor 260a may distinguish the user from the voice signals, collect the wake-up voice specific to the user, and match the user with the wake-up voice specific to the user.

More specifically, the processor 260a may distinguish the user using the spectrum of the voice signal and may selectively perform context dependent speaker identification using a keyword of the wake-up voice and context independent speaker identification based on an unstructured natural language command voice as a method for identifying the wake-up voice specific to the user.

The processor 260a may extract a representative value or an average value from the spectrum and classify the representative value or the average value by clustering to match the wake-up voice specific to the user with the user.

The processor 260a may generate and store parameter values for voiceprint analysis such as a frequency bandwidth, an amplitude spectrum, and the like of the voice signal of the user's wake-up voice and the unstructured natural language command voice signal. Then, when there is an input of a service request voice of the user, the processor 260a may compare voice parameter values in the service request voice with the pre-stored parameter values to perform an authentication procedure using the context independent speaker authentication method.

The input unit 250 may receive the voice signal. Further, the processor 260a may extract the spectrum of the voice signal to distinguish the user, stores parameter values for different feature values separately for different users, and generate a template and match the template with the wake-up voice that is used by the user.

The processor 260a may store the parameter values for the different feature values for different users and match the parameter values with the wake-up voices used by the user to generate the template.

According to another embodiment of the present invention, the processor 260a may further include a wake-up voice database and a command voice database. The wake-up voice database may store data necessary for determining whether the voice input by the input unit 250 is the wake-up voice and comparing the input voice with the wake-up voice.

In addition, the wake-up voice database included in the processor 260*a* may include wake-up voice data, wherein the wake-up voice word's configuration is the same but the wake up voice data includes different voice data based on sound features of afferent users uttering the same wake up voice. The command voice database may store data necessary for determining whether the voice input by the input unit 250 is a command voice and comparing the input voice with the command voice.

The wake-up voice database or the command voice database may store voice file data of a preset wake-up voice or command voice or data necessary for identifying the voice file, and the stored data may be updated or added. Further, the wake-up voice database may store a wake-up voice of each of other devices adjacent to the voice recognition service providing device.

The processor 260*a* may extract a spectrum for the arbitrary voice signal and compare the spectrum with the template predetermined for each user to extract a distance.

The processor 260*a* distinguishes the user through a voice input by the input unit 250 and a user identification and analyzes the identification result of the presence of the user to generate a wake-up voice determination result for the input voice. The wake-up voice determination result is a determination result of how much the input voice matches the wake-up voice.

The wake-up voice determination result may be generated numerically. The input voice is compared with the data stored in the wake-up voice database. Further, a degree to which the input voice matches with the stored wake-up voice data is numerically generated. When the degree of match therebetween is equal to or above a predetermined criterion (e.g., 80% or 70%), the wake-up voice determination result may yield the input voice as a wake-up signal. On the other hand, when the degree of match is below the criterion, the wake-up voice determination result may yield a non-wake-up signal.

The processor 260*a* may perform, for the input voice signal, the distinguishing of the user and comparison with the template for the wake-up voice specific to the user. The processor 260*a* may classify the users into a first user, a second user, a n-th user using the voice signals and store a wake-up voice used by each user to generate a template.

The output unit 270 may compare the spectrum with the predetermined template specific to the user to yield a distance and may output a wake-up signal or a non-wake-up signal based on a difference between a length of the distance and a predetermined error range.

The processor 260*a* may distinguish the user from the input voice signal and compare the input voice signal with the wake-up voice used by the corresponding user to generate the wake-up signal or the non-wake-up signal. That is, when it is determined that the length of the distance is within the error range as a result of measuring the degree of match, the processor 260*a* may determine that the input voice signal is identified as the wake-up voice and transmit the wake-up signal or the non-wake-up signal to the output unit 270.

The output unit 270 may determine whether to wake-up the electronic device 100*a* based on the determination result from the processor 260*a*. The processor 260*a* or the output unit 270 may start in a normal mode, which is in a standby state since the wake-up voice or the command voice is not input.

When the input unit 250 receives the voice signal of the user, the processor 260*a* may recognize whether a voice input corresponding to the input voice signal is the wake-up voice and compare the input voice with the template to measure the degree of match, that is, distance therebetween and transmit the degree of match to the output unit 270. Then, the output unit 270 may determine whether to operate the electronic device 100*a* based on the wake-up signal or the non-wake-up signal.

Hereinafter, a method for providing a voice recognition service using the device for providing the voice recognition service based on the artificial intelligence mentioned above will be described.

Figure 5:
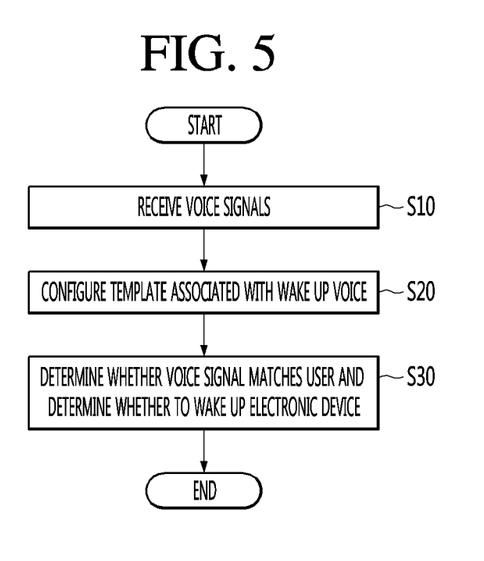
FIG. 5 illustrates a flowchart of a method for providing a voice recognition service based on artificial intelligence according to an embodiment of the present invention.

FIG. 5 illustrates a flowchart of a method for providing a voice recognition service based on artificial intelligence according to an embodiment of the present invention.

Referring to FIG. 5, the method for providing the voice recognition service based on the artificial intelligence may include a first step of receiving voice signals (S10), a second step of configuring a template associated with a wake-up voice specific to a user (S20), and a third step of determining whether a voice signal matches the user and determining whether to wake-up the electronic device (S30).

The first step S10 is a step of receiving voice signals having different frames specific to different users. Input of the voice signals is essential to distinguish the user and distinguish the wake-up voice specific to the user. Thus, the first step S10 is a process of receiving the voice signals specific to the different users through the input unit 250.

The first step S10 mentioned above is a process of accumulating data for distinguishing the user and the wake-up voice specific to the user. Thus, the first step S10 is a process of recognizing a voice of the user utilizing an actual preset database.

The second step S20 is a step of configuring the template associated with the wake-up voice specific to the user. The processor 260*a* may convert the voice signal into a frequency domain signal having a plurality of voice frames in a time domain and extract at least one spectrum associated with each voice frame of the frequency domain signal to distinguish the user, match a wake-up voice specific to the user with the user, and configure the template associated with the wake-up voice specific to each user.

Further, the processor 260*a* may extract a representative value or an average value from the spectrum and cluster and classify the representative value or the average value to match the wake-up voice with the user to generate the template.

That is, the input unit 250 may receive the voice signals of the different users. Further, the processor 260*a* may extract the spectrum of the voice signal to distinguish the user, separately store parameter values for a feature value for each user, and generate a template specific to the wake-up voice used by the user to match the template with the parameter values.

The third step S30 is a step of receiving an arbitrary voice signal and comparing the arbitrary voice signal with the template to determine whether the arbitrary voice signal matches the user, and determining whether to wake-up the electronic device based on the determination result.

The processor 260*a* distinguishes the user through the voice input through the input unit 250 and user identification and analyze the result of verifying the presence of the user to generate a wake-up voice determination result for the input voice.

The above mentioned first step S10 to third step S30 will be described in detail with reference to flowcharts of FIGS. 6 to 8.

Figure 6:
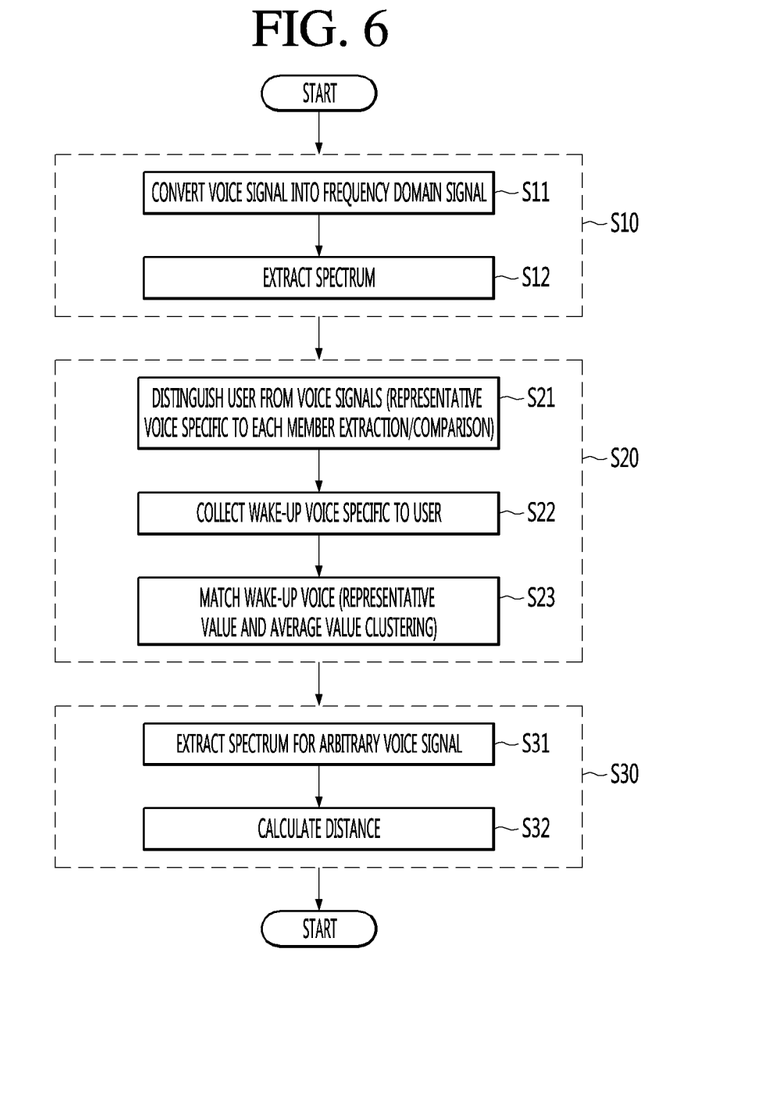
FIG. 6 illustrates a detailed flowchart of a method for providing a voice recognition service based on artificial intelligence according to an embodiment of the present invention.

FIG. 6 illustrates a detailed flowchart of a method for providing a voice recognition service based on artificial intelligence according to an embodiment of the present invention.

Referring to FIG. 6, the first step S10 may further include: converting the voice signal into a frequency domain signal having a plurality of voice frames in a time domain (S11); and extracting at least one spectrum associated with each voice frame of the frequency domain signal (S12).

The voice signals are received via the input unit 250 and the processor 260a may include a 'time-clustering' algorithm that non-linearly classifies the voice signals. The voice signal in the time domain, which represents the voice signal, may be transformed into a frequency domain spectrum representation using a converting algorithm such as a discrete Fourier transform (DFT) based on a frame, a pass band filter bank, a linear prediction coding (LPC) coefficient, a line spectrum pair (LSP), or a cepstral coefficient.

According to an embodiment, the processor 260a may extract pitch information for the input voice signal and utilize available spectrum information. According to an embodiment, the spectrum of the voice signal may be extracted using a peak extraction method for extracting information of remaining signal feature point values, a method for selecting an order of a high order peak, and the pitch information.

The input unit 250 receives the voice signal using the microphone according to an embodiment. Further, the processor 260a converts the input voice signal from the time domain voice signal to the frequency domain voice signal according to an embodiment of the present invention. In this conversion process, a device for estimating spectrum information of a voice signal may be used.

The second step S20 may include: distinguishing the user from the voice signals (S21); collecting the wake up voice specific to the user (S22): and matching the user with the wake up voice specific to the user (S23). The user refers to a member using the electronic device 100a. Further, the second step S20 is a process of collecting, together with a wake-up voice specific to each member, a voice input by each member when each member uses the electronic device 100a.

The processor 260a may perform verification of whether to wake up the electronic device 100a through distinguishing of the user from the input voice signals and comparison of the template with the wake-up voice.

The distinguishing of the user is a process of classifying the users into a first user, a second user, . . . , a n-th user based on the input voice signals. A method for extracting a feature vector for each frame and matching a pattern to a voice signal may be applied thereto. The method for extracting a peak for each frame, the method for selecting the order of the high order peak may be used or the spectrum may be extracted to distinguish the user.

A process of extracting a feature vector for each frame, calculating a weighted value, and storing the feature vector as a reference pattern may be performed. As user data accumulates, a degree of dispersion between the user data and the voice signal becomes smaller, which may achieve a highly reliable match.

In another embodiment, a pattern classification task may be included for the voice recognition. The pattern classification task is a task that, when an input pattern, which is a voice waveform in the voice signal, is given, compares the input pattern with a reference pattern to classify the input pattern as the most similar pattern.

In another embodiment, a pattern matching method using dynamic programming, a statistical modeling method such as a hidden Markov model (HMM), a method using a neural network, or a method using a knowledge based system may be applied thereto.

The matching of the wake-up voice S23 is a process of storing, for each user, a wake-up voice, which is usually used by each user, after the user is distinguished. The matching of the wake-up voice may further include: extracting a representative value or an average value from the spectrum; and classifying the representative value or the average value by clustering.

In this process, user feature information based on a voice signal of the user may be registered in a system database and may be stored as a template according to an embodiment of the present invention. That is, the template may be stored in a cluster form having a feature vector as a member.

The third step S30 may further include: extracting a spectrum for the arbitrary voice signal (S31); and comparing the spectrum with the template specific to the user to calculate a distance (S32). The third step will be described below with reference to FIGS. 7 and 8.

Figure 7:
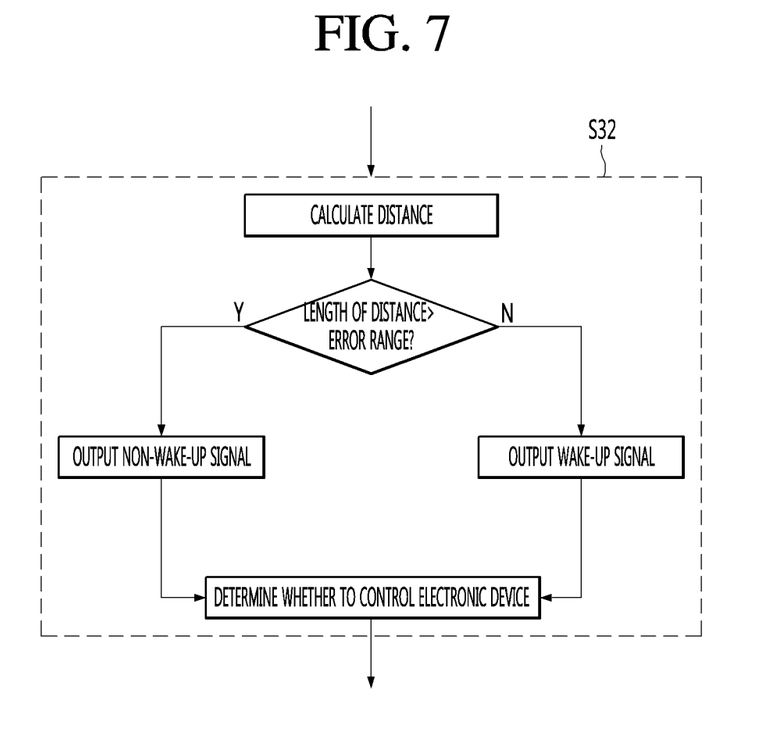
FIG. 7 is a flowchart illustrating a process of controlling an electronic device based on a distance calculation result according to an embodiment of the present invention.

FIG. 7 is a flowchart illustrating a process of controlling the electronic device 100a based on a distance calculation result according to an embodiment of the present invention.

Referring to FIG. 7, the calculating of the distance (S32) may include: comparing a length of the distance with a predetermined error range; outputting a wake up signal or a non-wake up signal based on a difference between the length of the distance and the predetermined error range; and determining whether to control the electronic device.

The processor 260a may organize the user feature as the template based on the spectrum of the voice signal and may compare the template with the arbitrary voice signal to recognize the stored user. That is, when a user registered in a user recognition system such as a robot interacts with the robot, the processor 260a may calculate a degree of match, that is, a distance between templates specific to n users stored in a database and the feature vector of the arbitrary signal.

Thus, the processor 260a recognizes the user with the arbitrary voice signal. When the template contains k clusters, the processor 260a may match the feature vector of the spectrum extracted from the arbitrary signal with clusters of each template.

The feature vector is compared with the clusters of each template to score a degree of match between the feature vector and each cluster of the template. When a maximum degree of match among extracted n degrees of match is within a recognition threshold, that is, a predetermined error range, the arbitrary voice signal may be recognized as a wake-up voice of the user.

Figure 8:
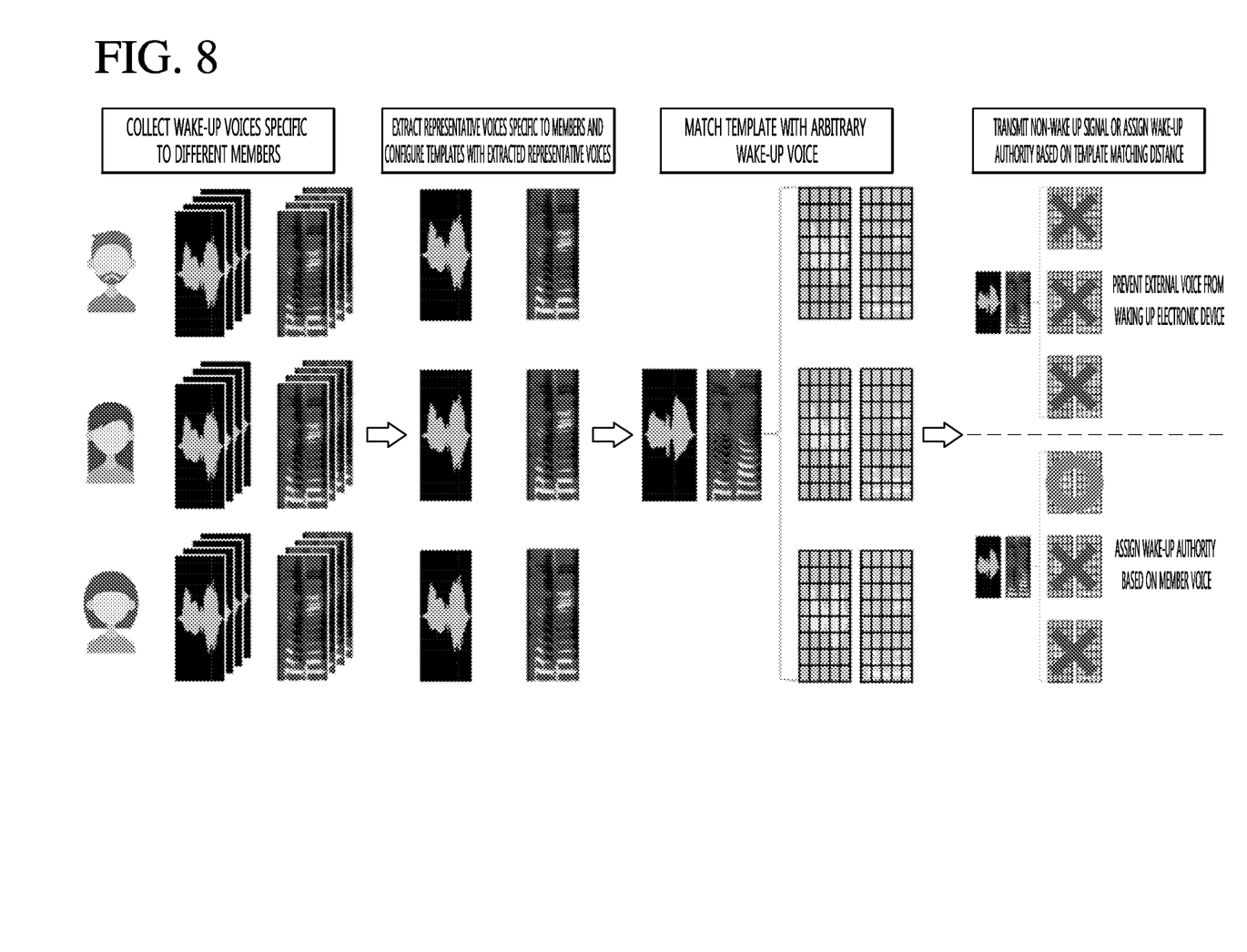
FIG. 8 is a diagram illustrating a method for providing a voice recognition service based on artificial intelligence according to an embodiment of the present invention.

FIG. 8 is a diagram illustrating a method for providing a voice recognition service based on artificial intelligence according to an embodiment of the present invention.

Referring to FIG. 8, a state in which the electronic device 100a is controlled by applying the method for providing the recognition service based on the artificial intelligence of FIGS. 5 to 7 described above is illustrated.

According to an embodiment, collecting of wake-up voices specific to different members may correspond to the first step according to the embodiment of the present invention. The voice signals specific to the users using the electronic device 100a may be collected or input, and the voice signals may be analyzed and made into data. Each data contains a spectrum of each voice signal and information about each used wake-up voice.

According to an embodiment, extracting of representative voices specific to members and configuring of templates with the extracted representative voices may correspond to the second step according to an embodiment of the present invention. A representative value or an average value may be extracted by accumulating voice signals specific to users, respectively. The configuring of the templates of respective users may be achieved by clustering for the accumulated data.

Thereafter, when an arbitrary wake-up voice is input, matching of the arbitrary wake-up voice and the template of each user may be proceed. The processor 260a may distinguish the user from the voice signals, collect a wake-up voice specific to the user, and match the user and the wake-up voice specific to the user with the template of each user.

According to an embodiment, after the template matching, a wake-up signal or a non-wake-up signal may be yielded based on a distance. When it is determined that a length of the distance is within an error range as a result of measurement of a degree of match, the voice signal is determined as the wake-up signal and the electronic device 100a is operated. On the other hand, when the length of the distance is out of the error range, the voice signal is determined as an external voice and then the non-wake-up signal is transmitted to the output unit 270 so that the electronic device 100a may not be operated.

When the input unit 250 receives the voice signal of the user, the processor 260a determines whether a voice input corresponding to the input voice signal is the wake-up voice. Then, the processor 260a may compare the input voice with the template to measure a degree of match, that is, a distance therebetween. The measured degree of match, that is, the distance therebetween is transmitted to the output unit 270. Then, the output unit 270 may determine whether to operate the electronic device 100a based on the wake-up signal or the non-wake-up signal.

According to the present invention, request voices are cumulatively input from users who are authorized to operate the electronic device 100a to build a database to automatically distinguish a user. Further, the electronic device 100a is automatically controlled in response to a voice signal associated to operation of the electronic device 100a, thereby decreasing a risk of malfunction.

The description above is merely illustrative of the technical idea of the present invention, and various modifications and changes may be made by those skilled in the art without departing from the essential characteristics of the present invention.

Therefore, the embodiments disclosed in the present invention are not intended to limit the technical idea of the present invention but to illustrate the present invention, and the scope of the technical idea of the present invention is not limited by the embodiments.

The scope of the present invention should be construed as being covered by the scope of the appended claims, and all technical ideas falling within the scope of the claims should be construed as being included in the scope of the present invention.

What is claimed is:

1. A method for recognizing a voice based on artificial intelligence for waking up an electronic device by distinguishing a user, the method comprising:
   a first step of receiving a voice signal having a plurality of frames according to the user;
   a second step of configuring a template associated with a wake-up voice according to the user; and
   a third step of receiving a first voice signal and comparing the first voice signal with the template to determine whether the first voice signal matches the user, and controlling whether to wake-up the electronic device based on the determination result,
   wherein the first step includes:
      converting the voice signal into a frequency domain signal having a plurality of voice frames in a time domain; and
      extracting at least one spectrum associated with each voice frame of the frequency domain signal,
   wherein the second step includes:
      distinguishing the user from the voice signals;
      collecting the wake-up voice according to the user; and
      matching the user with the wake-up voice according to the user,
   wherein the third step includes:
      extracting a spectrum for the first voice signal; and
      comparing the spectrum for the first voice signal with the template preset for each user to calculate a distance,
   wherein the calculating of the distance includes:
      comparing a length of the distance with a predetermined error range; and
      outputting a wake-up signal or a non-wake-up signal to control the electronic device when the length of the distance is greater than the predetermined error range.

2. The method of claim 1, wherein the matching of the wake-up voice includes:
   extracting a representative value or an average value from the at least one spectrum; and
   materializing the at least one spectrum by clustering the representative value or the average value.

3. A device for recognizing a voice based on artificial intelligence for waking up an electronic device by distinguishing a user, the device comprising:
   an input interface configured to receive a voice signal having a plurality of frames according to the user; and
   a processor configured to:
      convert the voice signal into a frequency domain signal having a plurality of voice frames in a time domain to extract at least one spectrum associated with each voice frame of the frequency domain signal,
      configure a template associated with a wake-up voice according to the user, and
      receive a first voice signal and compare the first voice signal with the template to determine whether the first voice signal matches the user, and control whether to wake-up the electronic device based on the determination result,
   wherein the processor is configured to convert the voice signal into the frequency domain signal having the plurality of voice frames in the time domain to extract the at least one spectrum associated with each voice frame of the frequency domain signal,
   wherein the processor is configured to:
      distinguish the user from the voice signals,
      collect the wake-up voice according to the user, and
      match the user with the wake-up voice according to the user,
   wherein the processor is configured to:
      extract a spectrum for the first voice signal, and
      compare the spectrum for the first voice signal with the template preset for each user to calculate a distance, and wherein the device further comprises an output interface configured to:
  compare a length of the distance with a predetermined error range, and
  output a wake-up signal or a non-wake-up signal to control the electronic device when the length of the distance is greater than the predetermined error range.

4. The device of claim 3, wherein the processor is configured to:
  extract a representative value or an average value from the at least one spectrum; and
  materialize the at least one spectrum by clustering the representative value or the average value to match the wake-up voice.

* * * * *